United States Patent [19]

Dacquay et al.

[11] Patent Number: 5,331,649
[45] Date of Patent: Jul. 19, 1994

[54] MULTIPLE WAVELENGTH LASER SYSTEM

[75] Inventors: Bruno Dacquay, Aubiere; Jean-Paul Chaduc, Clermont Ferrand, both of France

[73] Assignee: Alson Surgical, Inc., Fort Worth, Tex.

[21] Appl. No.: 727,689

[22] Filed: Jul. 10, 1991

[51] Int. Cl.⁵ .................................................. H01S 3/10
[52] U.S. Cl. .......................................... 372/23; 372/9; 372/97
[58] Field of Search .................. 372/9, 23, 92, 97, 107

[56] References Cited

U.S. PATENT DOCUMENTS

| | | | |
|---|---|---|---|
| 3,818,372 | 6/1974 | Wuerker et al. | 372/23 |
| 3,928,817 | 12/1975 | Chodzko | 372/23 X |
| 3,947,688 | 3/1976 | Massey | 250/495 |
| 4,287,486 | 9/1981 | Javan | 372/23 X |
| 4,425,648 | 1/1984 | Holly | 372/97 X |
| 4,517,980 | 5/1985 | Tagnon | 128/395 |
| 4,520,824 | 6/1985 | Swaniger et al. | 128/395 |
| 4,561,436 | 12/1985 | Munnerlyn | 128/303.1 |
| 4,583,539 | 4/1986 | Karlin et al. | 128/303.1 |
| 4,719,912 | 1/1988 | Weinberg | 128/303.1 |
| 4,757,507 | 7/1988 | Wondrazek et al. | 372/23 |
| 4,772,116 | 9/1988 | Schröder et al. | 351/214 |
| 4,907,235 | 3/1990 | Kuizenga | 372/21 |
| 4,920,541 | 4/1990 | Baumgartner et al. | 372/23 |

OTHER PUBLICATIONS

"High-average-power intracavity second-harmonic generation using KtiOPO₄ in an acousto-optically Q-switched ND:YAG laser oscillator at 5 kHz", Liu, et al., *Optics Letters*, vol. 9, No. 3, Mar., 1984, pp. 76–78.

Primary Examiner—John D. Lee
Attorney, Agent, or Firm—Gregg C. Brown; Jeffrey S. Schira

[57] ABSTRACT

A laser system having plural optical paths, each with a dielectric mirror for extracting a different wavelength of light from a laser beam, and a laser medium movable with respect to the different optical paths for injecting the laser beam into a desired optical path. The laser medium is mounted to a motor driven carriage for moving the laser medium with respect to the different optical paths.

23 Claims, 4 Drawing Sheets

MULTIPLE WAVELENGTH LASER SYSTEM

TECHNICAL FIELD OF THE INVENTION

The present invention relates in general to laser systems, and particularly to laser systems useful in medical procedures, such as ophthalmic surgical procedures. More specifically, this invention relates to a novel combination of components that enables a single laser system to generate laser beams of different wavelengths of light.

BACKGROUND OF THE INVENTION

A conventional laser system includes a single laser medium, or rod, with its end surfaces coated with a special reflective substance that is responsive to the wavelength of light desired to be emitted from the system. Such a system is well adapted for generating a single wavelength of light, but is not readily amenable to modification for providing different wavelengths of light.

It is also known that laser mediums constructed with certain crystal solids, such as YAG and YLF type crystals or other liquid or gaseous substances, have the characteristic ability of emitting several distinct wavelengths of light. For example, the possible wavelengths of light generated by YAG type crystals are 1,064 and 1,320 nanometers (nm), and the possible wavelengths for YLF type crystals are 1,054 and 1,320 rim. In order to obtain the desired output of the crystal, that is, the desired wavelength, it is generally necessary to fix dielectric mirrors, having the proper reflectance properties, at the opposing ends of the laser crystal medium. This in turn means that a single, conventional laser cavity is relatively restricted as to the variety of wavelengths that it can generate, as the components are not conveniently replaceable with others.

Since many current applications of lasers are dependent on the wavelength of light produced by the system, and since some applications, particularly medical applications, may require the use of more than one wavelength during a single procedure or related procedures conducted in sequence, it is frequently necessary to utilize more than one type of laser system to carry out the overall procedure. This is particularly true with respect to the use of lasers in ophthalmic surgical procedures, where it is frequently necessary to use more than one type of laser, such as one for initial targeting purposes, and then another for the actual surgical operation. In view of the high cost of modern laser systems and the size and relatively cumbersome nature of such systems, there is clearly a need for an improved system that is capable of generating a variety of wavelengths, but yet remains relatively compact compared to the use of a plurality of separate systems. The present invention is directed to satisfying this need.

SUMMARY OF THE INVENTION

A principal objective of the present invention is the provision of a laser system that is capable of generating a variety of wavelengths, but yet is relatively compact and inexpensive compared to a collection of individual systems, each of which is capable of generating different wavelengths of light.

Another objective of this invention is the provision of a laser system that is more versatile than prior systems due to the variety of wavelengths which the system is capable of generating.

The foregoing objectives and other general objectives of the present invention are achieved by the provision of a laser system which comprises a single laser medium, or laser beam, that is movable relative to a series of aligned optical components, so that the system as a whole is capable of generating a variety of wavelengths from a single medium by means of selective alignment of the laser beam with the different combinations of optical components.

In the preferred embodiment, a single laser is movable in a linear manner between different positions with respect to the optical components, thereby generating a different wavelength of light at each position. In another embodiment, the laser medium is moved in a pivotal manner to project the light beam at angularly displaced optical components, thereby also generating plural wavelengths of light. A processor control is adapted to cause movement of the laser medium with respect to a desired set of optical components to generate specified wavelengths of light.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, elements or functions throughout the views, and in which.

DETAILED DESCRIPTION OF THE INVENTION

As noted above, some of the presently available laser mediums generate beams of several wavelengths. This it true not only of crystals, but also of liquid and gaseous laser mediums. For example, possible wavelengths for YAG type crystals are 1,064 nm and 1,320 run, while the possible wavelengths for YLF type crystals are 1,054 nm and 1,320 run. The different wavelengths have different properties, and therefore different utilities. A wavelength that is desirable for one use may therefore be undesirable or even unsuitable for a different use. The present invention provides a laser system that includes means for selectively utilizing the desired wavelength of multiple wavelength laser mediums, such as YAG and YLF type crystals.

Figure 1:
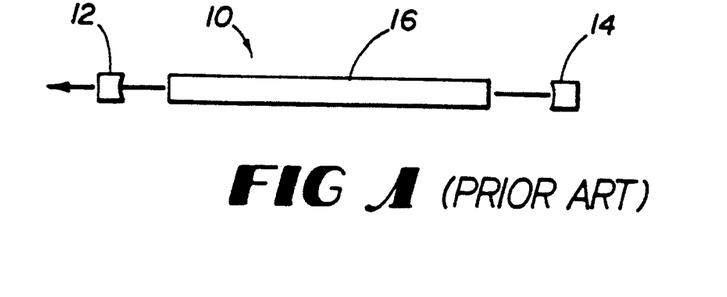
FIG. 1 is a schematic illustration of a prior art laser cavity.

As shown in FIG. 1, the means utilized to obtain a desired wavelength of light from the laser cavity 10 will typically comprise a pair of dielectric front and rear mirrors 12 and 14 that are specially treated such that maximum transmission of the desired wavelength from the laser cavity 10 is obtained. For example, the laser cavity 10 illustrated in FIG. I is arranged so as to utilize the 1,064 nm wavelength of a YAG type laser medium 16. The rear mirror 14 is therefore treated so as to allow for maximum reflection of this particular wavelength. Similarly, the front mirror 12 is treated so as to achieve maximum extraction of the 1,064 nm wavelength from the cavity 10. The transmission of the front mirror is fixed to obtain the maximum power of the system so that it can then be used in a surgical procedure.

In the event it becomes desirable to utilize the 1,320 nm wavelength instead of the 1,064 nm wavelength, different dielectric mirrors responsive to the 1,320 nm wavelength of the cavity 10 would be substituted for the mirrors 12 and 14 which are responsive to the 1,064 nm wavelength. This presents a very troublesome problem in practice, since the mirrors 12 and 14 must be precisely and carefully aligned with respect to the laser medium 16 and other optical elements in order to achieve a functioning system. Since most users of laser systems are not skilled technicians with respect to the internal structure or operation of the laser systems, it is not practical or efficient for such users to attempt to replace the mirrors 12 and 14 with others to provide wavelengths of light other than that for which the system was originally designed. Thus, although currently available laser mediums are capable of producing more than one wavelength of light, such laser systems are not capable of selectively utilizing all of the wavelengths generated by a particular laser medium. The present invention is directed to providing a system wherein many or all of the wavelengths of a specified laser medium can be easily and efficiently extracted from a single system.

Figure 2:
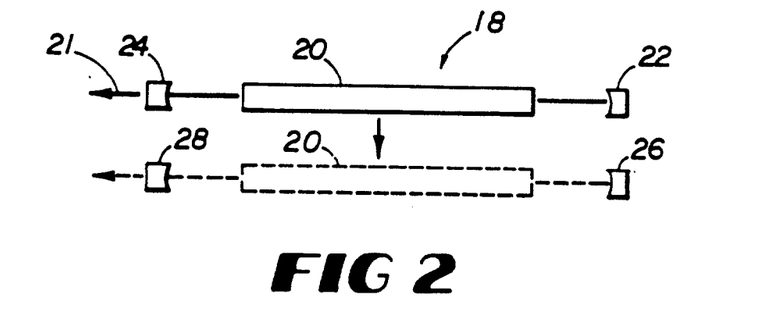
FIG. 2 is a schematic illustration of a laser cavity according to the present invention.

A basic principle of the present invention is illustrated in FIG. 2. In order to effectively utilize more than one wavelength of a single laser medium 20, such as a YAG type rod, the laser cavity 18 is arranged such that two different wavelengths are obtainable by moving the laser medium 20 itself between two different optical pathways. The laser beam 21 emitted by the laser medium 20 from the cavity 18 is thereby switched between the two optical pathways. The first optical pathway, shown in solid line, extends from rear mirror 22 through front mirror 24, while the second optical pathway, shown in broken line, extends from rear mirror 26 through front mirror 28. The pairs of mirrors 22, 24 and 26, 28 are selected to respond to different wavelengths of light so that light beams of different characteristics can be extracted as a function of the switched position of the laser medium 20. In this manner, two different wavelengths can be obtained from a single laser medium without requiring the user to replace dielectric mirrors or any of the other optical elements of the system. By utilizing additional pairs of dielectric mirrors, yet other wavelengths of light can be generated by the single laser medium 20. If optical components capable of wavelength doubling, tripling, etc., are included in this system, as is the case in a preferred embodiment of the invention described in greater detail below, additional wavelengths can be obtained from a single laser medium 20.

Figure 3:
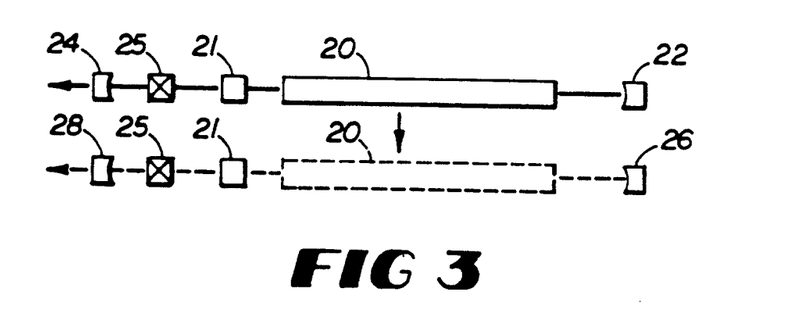
FIG. 3 is a schematic illustration of the laser cavity of FIG, 2 in combination with other optical elements for generating harmonics of the fundamental wavelength.
Figure 4:
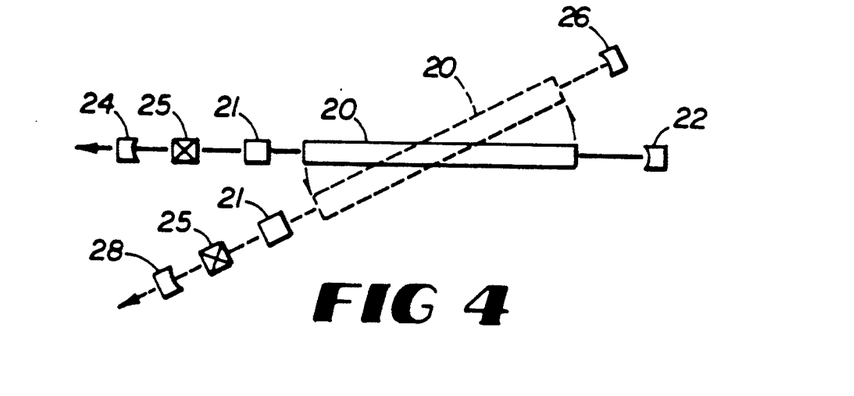
FIG. 4 is a schematic illustration of a laser cavity according to a further embodiment of the present invention.

The preferred embodiments of the present invention are illustrated in FIGS. 3 and 4. In both embodiments, the laser medium 20 is movable so as to be selectively aligned with two or more optical pathways, each capable of producing light wavelengths of different characteristics. In the embodiment illustrated in FIG. 3, the laser medium 20 is linearly moved in a mechanically manner in a direction perpendicular to the optical pathways. In the embodiment illustrated in FIG. 4, the laser medium 20 is selectively aligned with different optical pathways by means of axial rotation of the medium. Although only two optical pathways are illustrated in FIGS. 3 and 4, the invention is not limited to the utilization of two such optical pathways. For example, it is contemplated that the embodiments illustrated in FIGS. 3 and 4 may comprise four optical pathways, with two of the optical pathways adapted for transmission of respective wavelengths of a laser medium 20 that produces dual wavelengths, and the other two optical pathways designed for doubling the wavelengths. Thus, with a laser medium 20 utilizing a YAG type crystal, the present invention makes possible the generation of wavelengths of 1,064, 1,320, 532 and 660 nm from a single laser system. Only the optical pathways designed for wavelength doubling are illustrated in FIGS. 3 and 4. Moreover, while FIG. 3 illustrates the movement of the laser medium 20 in a linear manner, the pairs of dielectric mirrors could be mounted in correspondingly frontal and rear circular orientations, with the single laser medium 20 being mounted for arcuate movement, much like the barrel of a gatling gun.

The optical components utilized in the illustrated pathways include rear dielectric mirrors 22 and 26, laser medium 20, optical elements 21 utilized to facilitate focusing of the beam at phase matched crystals 25 which facilitate doubling of the wavelength, and front mirrors 24 and 28 to provide for selective extraction of the desired wavelengths. All of the foregoing components are conventional optical elements typically utilized in laser systems. Other elements of the system, such as optical fibers for transmission to a surgical probe, coupling optics, or shutters, are not illustrated in FIGS. 3 and 4, but nonetheless can comprise components of the overall laser system.

Figure 5:
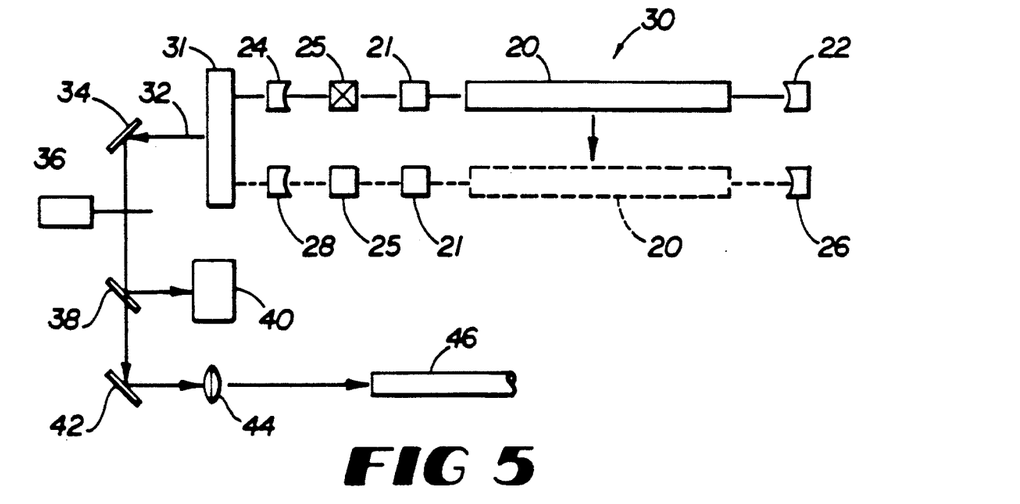
FIG. 5 is a schematic illustration of a laser system according to the invention adapted for use in the surgical field for the/treatment or removal of tissue.

Components which are external to the laser cavity may be shared by the various optical pathways included in the system, such as shown in FIG. 5. Here, the laser beam 32 of selected wavelength exiting the cavity 30 is channeled through a multiplexer 31 toward a high efficiency turning mirror 34 where the beam 32 is then redirected along an orthogonal path to a shutter mechanism 36. The multiplexer 31 includes a number of optical input ports that are spaced apart in a manner corresponding to the positions that the laser medium 20 can assume when selectively moved in association with different pairs of front and rear dielectric mirrors. The multiplexer 31 also includes internal optical elements, such as reflective mirrors or fiber optic components for channeling each of the plural input ports to a single output port. In this manner, the laser medium 20 can be selectively moved in association with different front/rear mirrors to produce different wavelengths, but the output thereof is carried by a single light path 32 without the need to manually change or switch the selected light beam from the cavity 30 to the light path 32. In the alternative, the multiplexer 31 can be omitted, and one end of a connectorized optical cable can be permanently connected to the light path 32, and the other end manually connected to the appropriate active output of the laser system.

The shutter 36 is electrically operable to completely obstruct the laser beam and thus effectively shut it off, or allow total transmission of the beam 32. A partially reflecting mirror 38 is situated in the path of the laser beam 32 so that only a small portion of the light is reflected to the input of a conventional power measuring cell 40. Laser power measuring cells are available for correlating the intensity of the light to a power level that is visually readable from a meter or digital readout. While the partially reflecting mirror 38 reduces the power of the laser beam 32 to a small degree, a substantial amount of the laser beam power is transmitted therethrough to another high efficiency reflecting mirror 42 to change the direction of the laser beam 32. A focusing lens 44, or other focusing means, can be fixed in the optical path for concentrating the beam onto another optical element, such as a fiber optic cable 46. As is well known, the fiber optic cable 46 is flexible and can be utilized for carrying the laser beam in a circuitous path or for directing the beam in numerous directions. The fiber optic cable 46 can be used by the surgeon, in conjunction with a microscope to carry out ophthalmic operations or procedures. The free end of the fiber optic cable 46 can also be connected to other well known equipment, such as a slit lamp, handpiece, or endocular probes, etc. Particularly, a surgeon may use a beam of one wavelength to aim or target the light at a particular tissue location, and utilize a different wavelength to carry out the actual cell destruction. It should be understood that the principles and concepts of the invention can be utilized with lasers producing both visible and nonvisible light beams.

Figure 6:
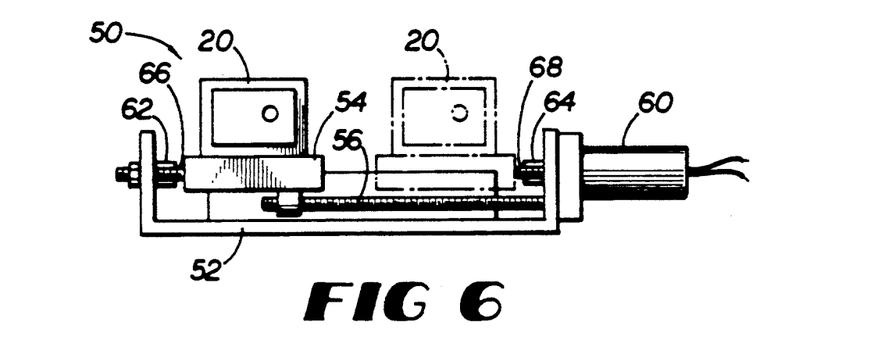
FIG. 6 is a frontal end view of a carriage for moving the laser medium between different optical pathways.
Figure 7:
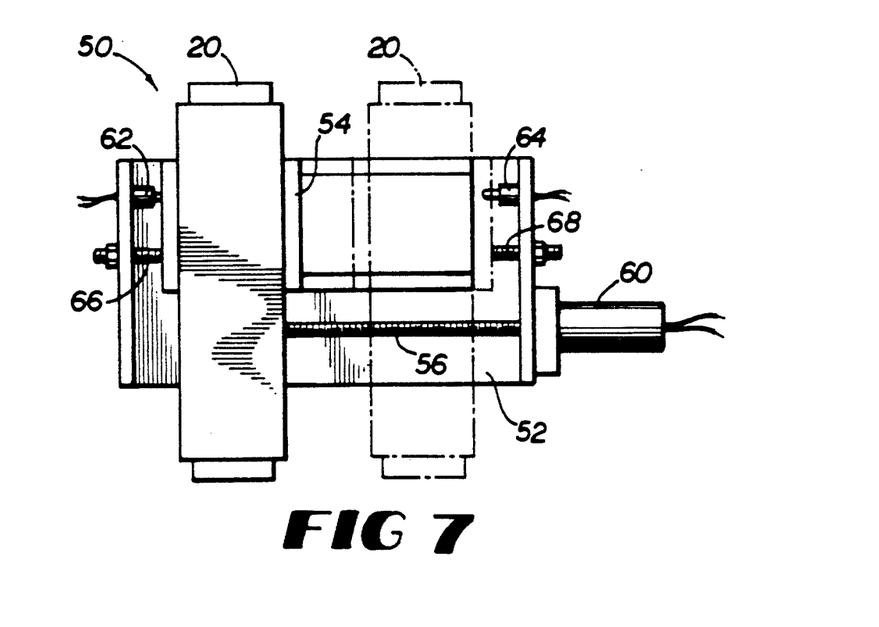
FIG. 7 is a top view of the carriage shown in FIG. 6.

The means utilized to move the laser medium 20 between different optical pathways may generally comprise any known means for conveniently, reliably and accurately moving a mechanical element through a specified distance upon command. The means will typically comprise electromechanical components arranged such that precise alignment of the laser medium 20 with the different optical pathways is achieved in a reliable and convenient manner. One suitable means for moving the laser medium 20 is illustrated in FIGS. 6 and 7. As illustrated in FIG. 6, the means includes a carriage 50 having base support 52, a laterally movable carriage plate 54 to which the laser medium 20 is mounted, an actuation screw 56 for moving the carriage plate 54, and a back-geared motor 60 for rotating the screw 56. The carriage plate 54 is preferably bearinged for slidable movement on the base support 52. These elements are controlled as to position by means of first and second electrical sensor stops 62 and 64, and first and second mechanical stops 66 and 68, as shown in FIG. 7. The electrical sensor stops 62 and 64 may be electrical switched, such as microswitches, while the mechanical stops 66 and 68 may be adjustable studs.

The laser medium 20 is selectively moved between two specified positions by way of the carriage 50 in the following manner. In one fixed position of the laser medium 20, as shown in solid line in FIG. 6, the carriage plate 54 abuts against the mechanical stop 66 and thus is maintained in a stable predefined position aligned with one optical pathway. When it is desired to move the laser medium 20 to a different position, such as shown in broken line, the laser beam emitted therefrom can be aligned with a different optical path associated with different front/rear dielectric mirrors to thereby provide a different wavelength of light. The laser medium 20 is moved in a rectilinear manner by energizing the motor 60 with a current of one polarity for rotating the motor shaft in a specified angular direction. The screw 56, which is connected directly to the motor shaft, or thereto by way of gears (not shown), is also rotated in a specified direction. The screw 56 mates with inner threads formed within the carriage plate 54 to thereby move the plate, and thus the laser medium 20, in a linear direction. In the example, the carriage plate 54 is moved to the right, as noted in the drawings, until the electrical stop 64, in the nature of a microswitch, is actuated. A contact closure, or opening, of the electrical stop 64 is transmitted to a control for interrupting the current to the motor 60. The position of the electrical stop 64 with respect to the carriage plate 54 is preadjusted so when the motor 60 stops, the carriage plate 54 is abutted against the mechanical stop 68. The laser medium 20 is thereby moved to the location shown in broken line, in a precise and efficient manner. The carriage plate 54 and thus the laser medium 20 can be returned to the other location (shown in solid line) by actuating the motor 60 with a current of opposite polarity, thereby rotating the screw 56 in a opposite direction and moving the carriage plate 54 to the left until the electrical stop 62 is actuated. Such an arrangement is effective to move the laser medium 20 in a linear path between two positions. A carriage of similar design suitable for use with the invention is obtainable from Newport, 18235 Mt. Baldy Circle, Fountain Valley, Calif.

While not shown, the laser medium 20 can be mounted on a similar carriage structure, without the electrical and mechanical stops, and utilized to move the laser medium 20 between numerous linear positions. With this technique, the motor 60 can be equipped with an angular encoder, or a tachometer or similar device, for measuring the number of rotations of the motor shaft. With this information, and knowing the linear movement of the carriage plate 54 for each turn of the motor shaft, the precise linear position of the carriage plate 54, and thus the laser medium 20, can be determined by appropriate control circuitry counting the number of rotations of the motor shaft.

Rather than constructing the carriage 50 for linear movement, the carriage can be fabricated as a circular structure for moving the carriage plate in a circular path. In this situation, the screw 56 would be flexible so that it would also follow a curved path, thereby pushing or pulling the carriage plate 54 along the circular path. Again, the number of rotations of the motor shaft would translate into precise, accurate movements and positions of the carriage plate 54, and thus the laser medium 20, for precise alignment thereof with accurately arranged front/rear mirrors for generating different wavelengths.

Figure 8:
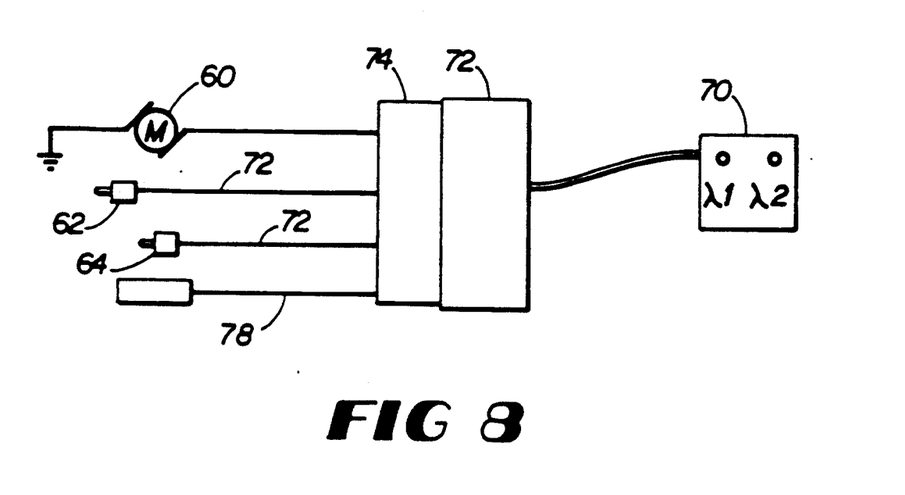
FIG. 8 is an electrical block diagram of a processor circuit for controlling the movement of the laser medium.

FIG. 8 illustrates a control system operable by a surgeon, or user of the laser system, for controlling the position of the laser medium 20 and thus the selection of various wavelengths capable of being generated. A position control 70 includes switches or other manually operable devices for allowing the user to select a particular wavelength of light to be used during the surgical procedure. A microprocessor 72, or other programmed or non-programmed circuits, are responsive to the selection of a particular wavelength for generating other signals via an interface 74 for applying or removing power from the motor 60. It is contemplated that a reversible DC motor will be utilized for moving the carriage plate 54 in response to positive or negative polarity current, although AC or pulsed DC motors can be used with equal advantage. The interface 74 includes driver circuits for providing sufficient current to the motor 60 to rotate the screw 56 and move the carriage plate 54. Contact closures or open conditions from the electrical stops 62 and 64 are transmitted by way of conductors 76 to the interface 74 of the microprocessor 72. In addition, motor shaft encoder signals can be transmitted to the microprocessor interface 74 by way of conductors 78. The signals on either set of conductors 76 or 78 can provide interrupts to the microprocessor 72 for stopping the motor 60 by halting the current supplied thereto. The microprocessor 72 would typically be programmed to count the number of shaft encoder pulses on conductor 78 to determine the exact position of the laser medium 20. The positioning of equipment in such a manner with the electro-mechanical apparatus is disclosed in U.S. Pat. No. 4,145,593, the disclosure of which is incorporated herein by reference. The angular positioning of equipment, such as required in the embodiment shown above in FIG. 4, can be similar to that described in U.S. Pat. No. 4,392,187, the disclosure of which is also incorporated herein by reference.

Figures 9A, 9B:
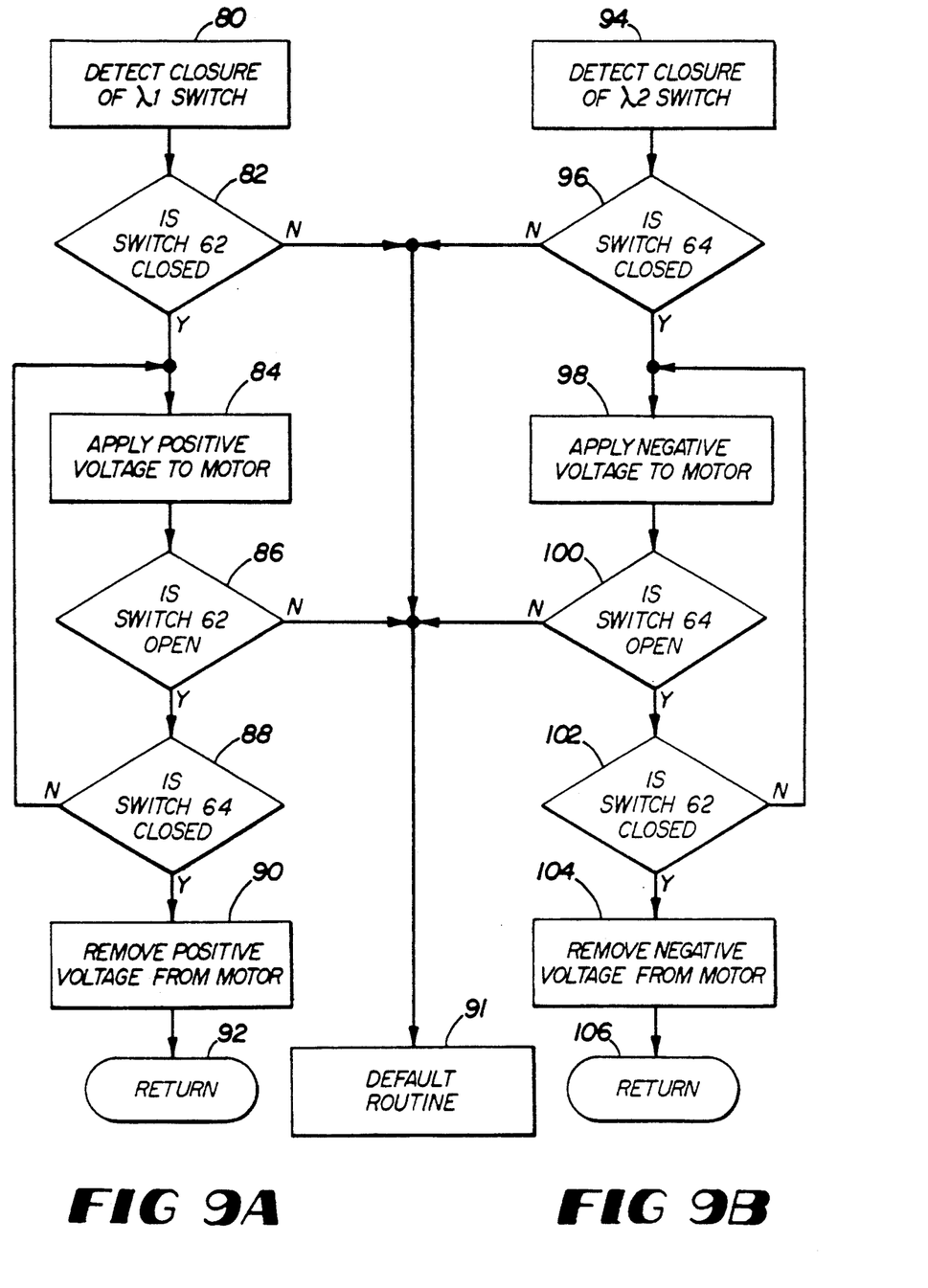
FIGS. 9a and 9b are flow charts the programmed operation of the control circuit of FIG. 8.

FIGS. 9a and 9b illustrate more specifically the operation of the processor controlled circuit of FIG. 8. With respect to FIG. 9a, it is assumed that the laser medium 20 is initially located at the left-hand position of FIG. 6 and is capable of producing one wavelength of light, and the user of the system desires the other wavelength of light. For purposes of illustration, it is assumed that with reference to FIG. 6, it is desired to change the wavelength from that shown by the laser medium 20 in solid line ($\lambda 2$) to the position shown in broken line ($\lambda 1$). It is further assumed that when the laser medium 20 is in the position shown in FIG. 6, electrical switch 62 is closed and electrical switch 64 is open. At this time, and before the user provides an input into the system, the microprocessor 72 is involved in a software loop indicated by program flow block 80. When in such loop, the microprocessor 72 repetitively monitors the position control switches 70 to determine if the operator desires the laser medium to be moved to the right, thereby generating a different wavelength.

In the event the operator pushes, or otherwise actuates the switch ($\lambda 1$) indicating that the laser medium 20 is to be moved to the right, the microprocessor 72 detects such affirmative action according to block 80. As noted in program flow block 82, the microprocessor 72 determines the state of switch 62, and if closed, the interface 74 is caused to apply a positive voltage to the motor 60, as noted in program flow block 84. The motor 60 is responsive to the positive voltage to rotate in a direction such that the screw 56 is turned and the carriage plate 54 is moved to the right. After the motor 60 is actuated and the carriage plate 54 has moved, the microprocessor 72 determines whether the switch 62 has opened, indicating the movement of the laser medium 20 toward the other position. On an affirmative indication of the test of program flow block 86, the processor 72 determines whether the other electrical switch 64 has closed, as noted by program flow block 88. The microprocessor is maintained in the loop between blocks 84 and 88 until the laser medium 20 has abutted against the mechanical stop 68 and has closed the electrical switch 64. When this occurs, the microprocessor transfers from block 88 to program flow block 90 where the positive polarity voltage is removed from the motor 60. The laser medium 20 is thus accurately positioned as shown in the broken line of FIG. 6, thereby being aligned with the optical components such that the $\lambda 1$ wavelength is generated. On a negative determination of the program flow blocks 82 and 86, the processor 72 defaults to a software routine 91 to indicate that the carriage plate 54 is stuck or jammed. After removal of the power from the motor 60 as indicated in block 90, the microprocessor 72 returns 92 to the program start for monitoring the detection of further inputs to the control 70 by the operator of the system.

FIG. 9b illustrates the programmed operations of the microprocessor 72 in responding to an input by the operator to move the laser medium 20 to a position for generating the $\lambda 2$ wavelength. When the $\lambda 2$ switch is activated by the operator on the control input 70, such action is detected by the microprocessor 72, as noted by program flow block 94. The microprocessor 72 determines, by way of blocks 96, that the state of switch 64 is closed, indicating that the laser medium 20 is presently in a position for generating the $\lambda 1$ wavelength. On an affirmative decision from block 96, the microprocessor 72 applies a negative polarity voltage to the motor 60, thereby causing the screw 56 to turn in the direction to move the laser medium 20 away from the electrical stop 64. As noted in program flow block 100, the state of switch 64 is determined, and if open, control is transferred to program flow block 102. Here, the microprocessor 72 determines whether or not the other electrical switch 62 has yet been closed. If not, the microprocessor remains in the loop between blocks 98 and 102 until electrical switch 62 is closed. When closed, the microprocessor 72 proceeds to block 104 removes the negative polarity voltage from the motor 60, whereupon the laser medium 20 remains in the stable position aligned with a different set of optical components for generating the $\lambda 2$ wavelength. The microprocessor returns to the main program loop, as noted in block 106, for monitoring subsequent inputs from the system user, via the control 70.

Figure 10:
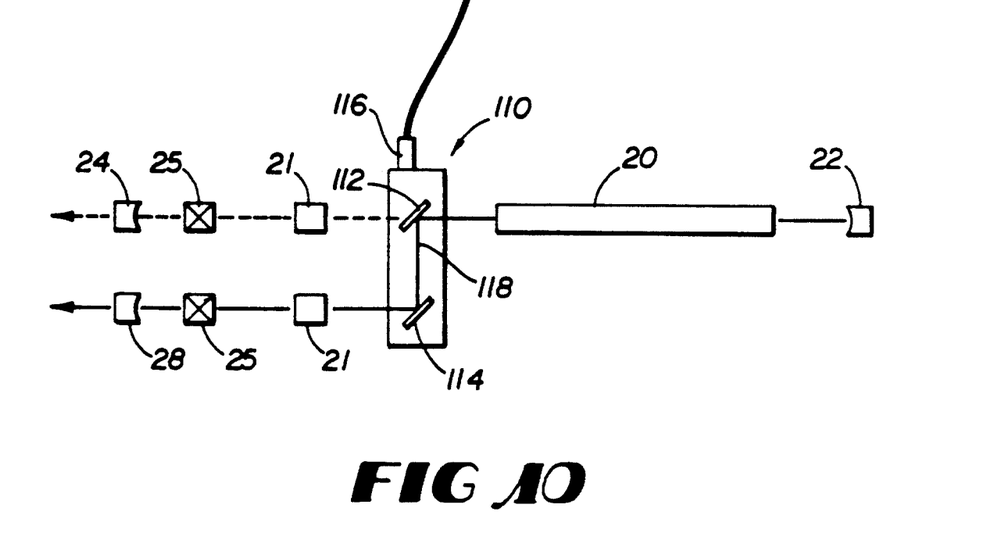
FIG. 10 is a schematic illustration of a further embodiment of the invention wherein switchable optical means are utilized to switch the laser beam from a first optical path to a second optical path.

In accordance with another embodiment of the invention shown in FIG. 10, a single laser medium 20 is operable to generate multiple wavelengths of light by way of an optical switch 110 that is adapted to redirect the laser beam with respect to different optical paths. In this embodiment, the laser medium 20 itself remains fixed, while the beam output therefrom is switched by the optical switch 110. The optical switch 110 includes an upper reflective mirror 112 and a lower reflective mirror 114, each ganged together by linkage (not shown) so that both reflective mirrors 112 and 114 are moved in unison. An electrical actuator 116, such as a solenoid, is connected to the linkage for moving the mirrors 112 and 114 in such a manner that in one position, the light beam emitted from the laser medium 20 is unobstructed by the upper mirror 112, and thus is directed along the light path shown in broken lines. When the actuator 116 is actuated, the upper and lower reflective mirrors 112 and 114 are moved at 45° angle positions into the path of the laser beam, thereby directing it downwardly along path 118, and then laterally along the path shown in solid line. With this arrangement, the laser beam can be directed in the optical path associated with frontal dielectric mirror 24, or in a different optical path associated with frontal dielectric mirror 28, thereby producing different wavelengths. The rear mirror 22 is of the type which can operate effectively with both wavelengths, such as a fundamental and harmonics thereof, and thus there is a single rear mirror 22 associated with both front mirrors 24 and 28. Again, the electrical actuator 116 can be actuated by switches operable by the user of the system.

From the foregoing, disclosed are the basic concepts of the methods and apparatus of the invention for efficiently generating multiple laser wavelengths while maintaining the system compact and economically reasonable. Those skilled in the art may readily appreciate that other optical components may be utilized in each optical path, inside or outside the cavity, including acousto-optic structures, locker mode elements, etc., to further modify or treat the laser beam to achieve the desired characteristics. However, while the various embodiments of the invention have been disclosed with reference to specific forms of structure and operation, it is to be understood that many changes in detail may be made as a matter of engineering choices without departing from the spirit and scope of the invention as defined by the appended claims.

What is claimed is:

1. A laser system adapted for generating plural wavelengths of light, comprising:
    a laser medium having a longitudinal axis for generating a beam of light;
    a pair of different sets of optical elements defining a first linear pathway parallel to the longitudinal axis and a second linear pathway parallel to the longitudinal axis, each pair of optical elements sets being responsive to the beam of light for producing respective different wavelengths of light; and
    means for selectively directing the beam of light with respect to the first linear pathway and the second linear pathway for generating a desired wavelength of light.

2. The laser system of claim 1, wherein the optical elements comprise mirrors for extracting a defined wavelength of light from the beam.

3. The laser system of claim 1, wherein the optical elements comprise plural pairs of mirrors, each pair comprising a mirror located at opposing ends of the laser medium.

4. The laser system of claim 1, further including means for directing the beam of light with respect to the different optical elements while maintaining the laser medium stationary.

5. The laser system of claim 4, further including a single rear mirror, and a pair of front mirrors.

6. The laser system of claim 5, further including an optical switch for switching the laser beam between the pair of front mirrors to generate corresponding wavelengths.

7. The laser system of claim 1, further including a multiplexer having plural optical inputs and a single output for redirecting the laser beam from any one of the different optical elements to a single output.

8. The laser system of claim 1, wherein at least one optical element includes means for generating harmonics of a fundamental wavelength.

9. A laser system adapted for generating plural wavelengths of light, comprising:
    a laser medium for generating a beam of light;
    a plurality of different optical elements defining different pathways, said optical elements being responsive to the beam of light for producing respective different wavelengths of light;
    means for selectively directing the beam of light with respect to the different optical elements for generating a desired wavelength of light; and
    means for moving the laser medium with respect to the different optical elements to select a pathway.

10. The laser system of claim 9, further including a carriage to which the laser medium is mounted for movement, said carriage being movable to predefined positions aligned with respective pathways..

11. The laser system of claim 9, wherein said moving means is adapted for moving the laser medium in a rectilinear path.

12. The laser system of claim 9, wherein said moving means is adapted for moving the laser medium in a curved path.

13. The laser system of claim 9, wherein said moving means is adapted for moving the laser medium about a pivotal axis.

14. A laser system adapted for generating plural wavelengths of light, comprising:
    a single laser medium for generating a beam of light;
    a plurality of pairs of mirrors, each pair responsive to the light beam for extracting a different wavelength of light, and each mirror of a pair being disposed at opposing ends of the laser medium; and
    means for moving the laser medium to respective locations between a selected pair of said mirrors; and
    means operable by a user of the system to selectively position the laser medium to thereby generate a desired wavelength of light.

15. The laser system of claim 14, wherein said moving means comprises a carriage to which the laser medium is mounted, and including a control for selection by the user of a desired wavelength, and a motor operable for moving the carriage in response to a selection of a wavelength for moving the laser medium between a pair of mirrors for extracting the desired wavelength.

16. The laser system of claim 14, wherein said laser medium is adapted for generating at least two different defined wavelengths of light.

17. The laser system of claim 16, wherein said laser medium includes a crystal comprising yttrium.

18. A method for constructing a laser system capable of generating different wavelengths of light, comprising the steps of:
    arranging a plurality of sets of mirrors to form a plurality of optical pathways, at least one mirror in each set of mirrors capable of extracting a predefined wavelength of light from the system;
    fixing a laser medium capable of generating a plurality of distinct wavelengths of light to a carriage; and
    coupling a motor with respect to the carriage so that in response to electrical signals the motor moves the carriage for aligning the laser medium with respect to a desired optical pathway.

19. The method of claim 18, further including moving the carriage in a rectilinear path between different optical pathways.

20. The method of claim 18, further including fixing mechanical stops associated with each optical pathway so that the carriage abuts the mechanical stops and aligns the laser medium with the optical pathways.

21. The method of claim 18, further including fixing electrical stops associated with each optical pathway to control activation of the motor.

22. The method of claim 18, further including utilizing a laser medium that produces an inherent pair of different light wavelengths, and selecting a corresponding pair of front mirrors that are each responsive to a different one of the wavelengths of light, whereby when the laser medium is aligned with an optical pathway associated with one selected front mirror, one wavelength is extracted from the system, and when the laser medium is aligned with the other optical pathway associated with the other selected front mirror, the other wavelength is extracted from the system.

23. The method of claim 22, further including an optical multiplexer for receiving the light extracted by said front mirrors and directing the light of different wavelengths along a common pathway.

* * * * *